June 18, 1957 A. RUNE ET AL 2,795,811
SAUSAGE DESTRINGING APPARATUS
Filed May 10, 1955 2 Sheets-Sheet 1

ADOLPH RUNE
RALPH M. FAUST
INVENTORS

BY R. G. Story
ATTORNEY

June 18, 1957　　　A. RUNE ET AL　　　2,795,811
SAUSAGE DESTRINGING APPARATUS
Filed May 10, 1955　　　　　　　　　　　2 Sheets-Sheet 2

ADOLPH RUNE
RALPH M. FAUST
INVENTORS

BY R. G. Story

ATTORNEY

United States Patent Office 2,795,811
Patented June 18, 1957

2,795,811
SAUSAGE DESTRINGING APPARATUS

Adolph Rune, Winthrop Harbor, and Ralph M. Faust, Westchester, Ill., assignors to Swift & Company, Chicago, Ill., a corporation of Illinois Application May 10, 1955, Serial No. 507,442

8 Claims. (Cl. 17—1)

The present invention relates to an apparatus for removing the strings that were wrapped around a filled sausage casing to form the filled sausage casing into a length of links of sausages.

In the manufacture of sausages a casing is filled with a comminuted meat-containing mixture with the casing then being pinched off at regular intervals to form the lengths of sausages. One of the ways of pinching off the casing is to just wrap a short piece of string several times around the casing.

When skinless sausages are produced the casing is removed after the comminuted meat-containing mixture has been cooked and otherwise processed in the casing. A number of machines have been produced for removing these casings. With the casing removing machines generally in commercial use today, it is first necessary to delink the lengths of sausages before the casing is removed. Where a string has been used in the manner described to perform the linking the delinking process comprises the removal of this string. In order to perform this job at a speed commensurate with the speed of removal of the casings by the casing removal machines and to hold down the cost of carrying out the delinking process, it is desirable to have a method and process whereby this string removal can be performed by a machine. The principal of object of the present invention is to provide such an apparatus that is not only speedy but is sufficiently reliable so that all of the strings are removed. Obviously, if not all of the strings are removed, the failure to remove the strings will cause a malfunction in the casing removal apparatus and increase the cost by requiring inspection to detect those strings that are left on and requiring other operations to remove any of the strings that are left on.

A further object of the present invention is to provide a machine that is relatively inexpensive; a machine in which the majority of the components are standard, readily obtainable parts; a machine that requires no special skills to operate; and a machine that requires little maintenance and what maintenance is necessary can be provided by nonspecialists, i. e., individuals having the usual trade abilities.

Other objects and advantages will become apparent from the following description taken in conjunction with the drawings in which.

The present invention is intended to operate with a linking device wherein the linking is performed by wrapping several turns of a string at spaced intervals about the casing. Devices for linking lengths of filled sausage casings in this manner are illustrated and described in U. S. Patent No. 2,228,075.

In the present method for removing these strings an axial tension is applied to the lengths of casings and sausages. Preferably this tension is repeated a number of times in order to insure that the strings are removed. This periodic applying of tension to the lengths of casing and sausages loosens up the string sufficiently so that it falls from the casing.

Figure 1:
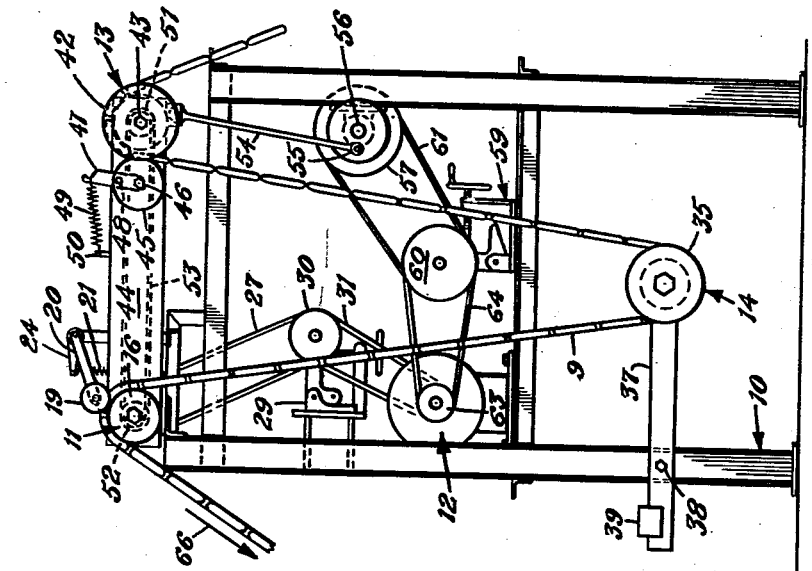
Figure 1 is a side elevation of an embodiment of the invention.
Figure 2:
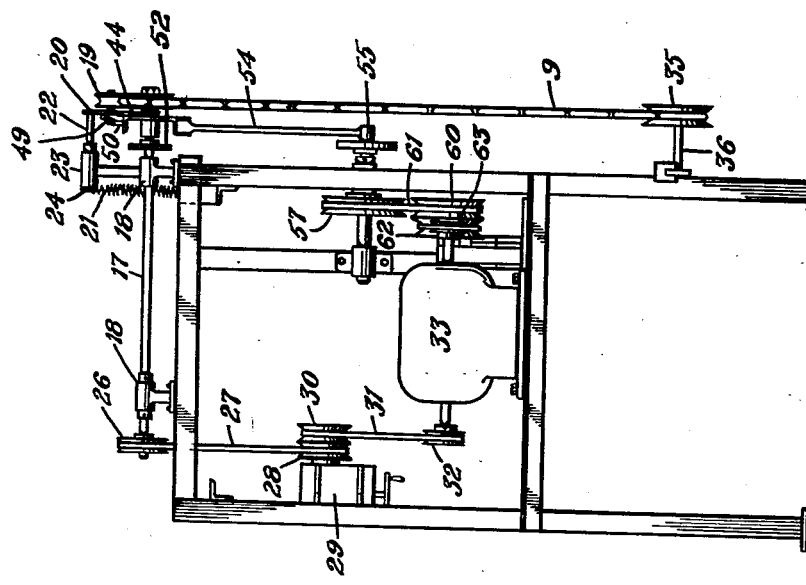
Figure 2 is an end elevation of the machine of Figure 1.

In the embodiment illustrated in Figures 1 and 2 for carrying out this process on lengths of sausage 9, the machine comprises a frame generally 10, a first means generally 11 for engaging and advancing the lengths of sausages, a power means generally 12 and a tension applying means including a sausage engaging and holding means generally 13 and a tensioning means generally 14.

The first sausage engaging means 11 includes a wheel 16 attached to a shaft 17 journaled in suitable bearings 18. The periphery of wheel 16 is grooved to receive the lengths of sausages and is knurled or otherwise roughened to increase the frictional engagement between the sausage casings and the wheel. In some embodiments the friction will be sufficient without the roughening of the surface. This will be particularly true where the wheel 16 is formed of rubber. A roller 19 rotatably mounted on one end of arm 20 pivotally attached to frame 10 is pressed against the opposite side of the lengths of sausages 9 by means of a spring 21 to hold the sausages in engagement with wheel 16. As will be seen in Figure 2, arm 20 is mounted on a shaft 22 journaled in a bearing 23 forming a part of frame 10. A second arm 24 is attached to the other end of shaft 22 with the spring 21 connecting the end of arm 24 and frame 10 to urge arm 24 and arm 20 downwardly so that roller 19 presses the lengths of sausages against wheel 16.

Shaft 17 has a pulley 26 attached thereto, with a belt 27 connecting pulley 26 with the output pulley 28 on a variable speed drive 29. The input pulley 30 of the variable speed drive 29 is connected with a belt 31 to a pulley 32 on the shaft of a motor 33.

From the first engaging means 11, the lengths of sausages 9 are passed around tensioning means 14. In this embodiment the tensioning means includes a grooved pulley 35 rotatably attached to the end of a shaft 36 which in turn is attached to the end of an arm 37. A bolt 38 pivotally secures the arm 37 to frame 10. The weight of arm 37 and pulley 35 urges the lengths of sausages resiliently downwards between the first engaging and advancing means 11 and the second engaging means 13. The extent to which it is urged downwardly can be varied by adjusting the position of a counterweight 39 on arm 37.

In the embodiment of Figures 1 and 2, the second sausage engaging means 13 is mounted so as to periodically apply a tension to the lengths of sausage 9 against the resistance of the tensioning means 14. To achieve this the second sausage engaging means 13 includes a grooved wheel 42, similar to wheel 16, fixed to shaft 43 journaled in one end of a rocker 44 which in effect forms a portion of frame 10. Actually, rocker 44 is pivotally mounted on shaft 17 as seen in Figure 2. The lengths of sausages 9 are held in engagement with wheel 42 by a roller 45. Roller 45 is rotatably secured to a pin 46 on one end of an arm 47. Arm 47 is pivotally attached to rocker 44 by means of a bolt 48. A spring 49 connects the opposite end of arm 47 with a post 50 on rocker 44 and urges arm 47 about bolt 48 so as to press the roller 45 against the opposite side of the lengths of sausages and to hold said lengths of sausages in engagement with wheel 42. A sprocket 51 fixed to shaft 43 is connected to a sprocket 52 attached to shaft 17 by a chin 53.

One end of a connecting rod 54 is pivotally attached to rocker 44 and at the other end is attached to a crank 55 fixed to shaft 56. Shaft 56 is suitably journaled in bearings forming a part of frame 10 and at the other end has a pulley 57 attached thereto. A variable speed drive generally 59 is employed with the output pulley 60 thereof being connected to pulley 57 by a bolt 61 and the input pulley 62 being connected to pulley 63 on the shaft of motor 33 by a belt 64.

In the operation of the embodiment of Figures 1 and 2, the lengths of sausages are threaded over wheels 42, around pulley 35, and over wheel 16. The machine is started, whereupon crank 55 is rotated thrusting rocker 44 up and down against the resilient urging of tensioning means 14. At the same time the first engaging and advancing means 11 continuously draws the lengths of sausages in the direction indicated by arrow 66 to advance the lengths of sausages through the machine. The periodic tensioning of the lengths of sausages caused by the movement of rocker 44 working against tensioning means 14 applies the axial tension of the lengths of sausages in the casing to loosen the strings from about the casing and to cause the strings to fall away from the casing.

Figure 3:
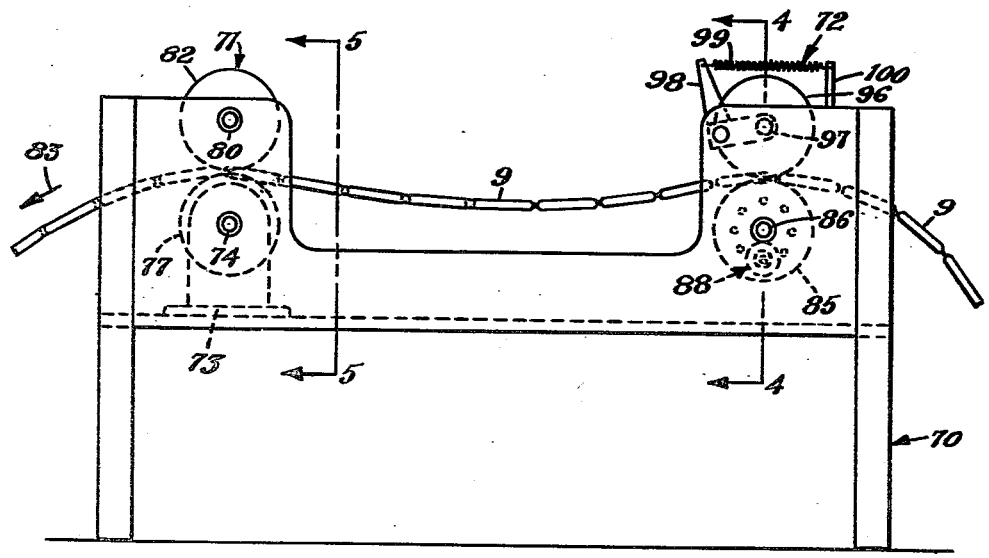
Figure 3 is a side elevation of a second embodiment of the invention.
Figures 4, 5:
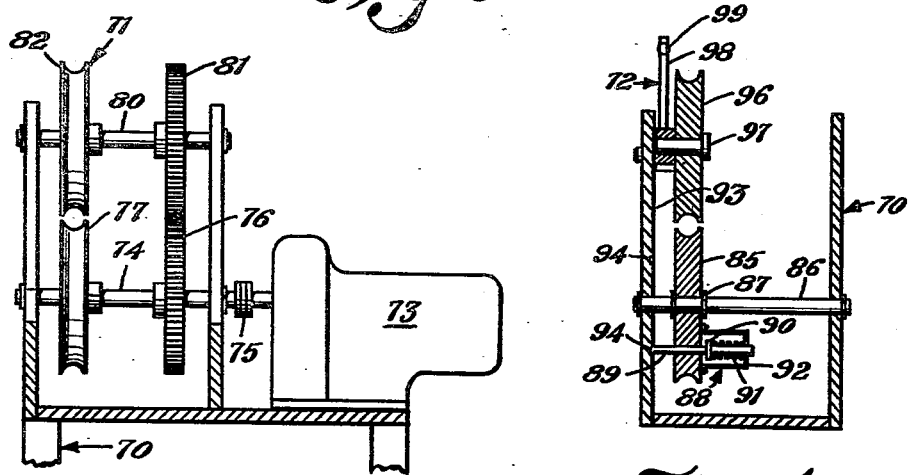
Figure 4 is an enlarged partial section taken at line 4—4 of Figure 3.
Figure 5 is an enlarged partial section taken at line 5—5 of Figure 3.

Referring now to the embodiment of Figures 3–5, a frame, generally 70, carries a first advancing and engaging means generally 71 and a second engaging and tensioning means generally 72. The first advancing and engaging means 71 includes a gear head motor 73, the output shaft of which is connected to a shaft 74 by means of a coupling 75. Shaft 74 is suitably journaled in frame 70 and has a gear 76 and a grooved wheel 77 secured thereto. A second shaft 80, also journaled in frame 70, has attached to it a gear 81 and a grooved wheel 82. The rotation of the output shaft of the gear head motor 73 rotates shaft 74 with shaft 80 being rotated by the engagement of the two gears 76 and 81. The lengths of sausages 9 are engaged between the two grooved wheels 77 and 82 and advanced in the direction indicated by arrow 83.

The engaging and tensioning means 72 comprises wheel 85 rotatably mounted on a shaft 86 and held in place by lock rings 87. Shaft 86 is suitably journaled in frame 70. Wheel 85 carries a detent generally 88 comprising a pin 89 slidably received within an opening in wheel 85. Pin 89 has a shoulder 90. A spring 51 pressing against shoulder 90 and a cap 92 secured to wheel 85 urges pin 89 in the direction of wall 93 of frame 70. Wall 93 has a series of notches 94 to receive pin 89.

A roller 96 on shaft 97 secured to one end of rocker 98 is used to urge the lengths of sausages into engagement with wheel 85. A spring 99 connecting the other end of rocker 98 and a post 100 on frame 70 urges roller 96 toward wheel 85.

As the lengths of sausages are drawn in the direction indicated by arrow 83 by the advancing and engaging means 71, the detent 88 periodically engages the notches 94 in frame 70. As this occurs, the rotation of wheel 85 is abruptly stopped or slowed momentarily. However, the continued pull applied to the lengths of sausages causes detent 88 to move away from wall 93 against the urging of spring 91 so that the detent rides along the inner face of wall 93 until the next notch 94 is reached, whereupon the detent 88 engages that notch causing an abrupt stopping of wheel 85. This action of the detent in momentarily slowing or arresting the rotation of wheel 85 provides a periodic axial tension to the lengths of sausages 9 that are continuously being urged in the direction indicated by arrow 83.

The foregoing description of specific embodiments are for the purpose of compliance with 35 U. S. C. 112, and we do not desire to be limited to the exact details shown and described, for obvious modifications will occur to a person skilled in the art.

We claim:

1. A device for removing the strings wrapped around a filled sausage casing to form the filled casing into a length of linked sausages, said device including a frame, a first wheel rotatably mounted on said frame, power means connected to said wheels to rotate said wheel, a second wheel rotatably mounted on said frame, said wheels being grooved to receive said length of sausages, said second wheel being spaced from said first wheel whereby each of said wheels will engage a different sausage in said length with a portion of said length extending between said wheels, and engaging and tensioning means associated with said wheels to periodically axially tension said portion of said length between said wheels.

2. A device for removing the strings wrapped around a filled sausage casing to form the filled casing into a length of linked sausages, said device including a frame, a first wheel rotatably mounted on said frame, power means connected to said wheel to rotate said wheel, a second wheel rotatably mounted on said frame, said wheels being grooved to receive said length of sausages, means to cause said length of sausages to engage said wheels, said second wheel being spaced from said first wheel whereby each of said wheels will engage a different sausage in said length with a portion of said length extending between said wheels, tensioning means mounted on said frame in a position spaced from said two wheels with said portion of said length extending about said tensioning means in contact therewith, said tensioning means being resiliently urged away from said wheels to apply tension to said portion of said length between said wheels, and means to periodically move one of said wheels away from said tensioning means.

3. A device for removing the strings wrapped around a filled sausage casing to form the filled casing into a length of linked sausages, said device including a frame, a first wheel rotatably mounted on said frame, power means connected to said wheel to rotate said wheel, a second wheel rotatably mounted on said frame, said wheels being grooved to receive said length of sausages, means to cause said length of sausages to engage said wheels, said second wheel being spaced from said first wheel whereby each of said wheels will engage a different sausage in said length with a portion of said length extending between said wheels, and tensioning means mounted on said frame in a position spaced from said two wheels with said portion of said length extending about said tensioning means in contact therewith, said tensioning means being resiliently urged away from said wheels to apply tension to said portion of said length between said wheels, said second wheel being mounted on a portion of said frame for movement toward and away from said tensioning means, said power means being connected to said portion of said frame to periodically move said second wheel toward and away from said tensioning means.

4. A device for removing the strings wrapped around a filled sausage casing to form the filled casing into a length of linked sausages, said device including a frame, a first wheel rotatably mounted on said frame, power means connected to said wheel to rotate said wheel, a second wheel rotatably mounted on said frame, said wheels being grooved to receive said length of sausages and having means associated therewith to engage said length of sausages with said wheels, said second wheel being spaced from said first wheel whereby each of said wheels will engage a different sausage in said length with a portion of said length extending between said wheels, and means associated with said second wheel to periodically releasably restrain the rotation of said second wheel to periodically apply an axial tension to said portion of said length.

5. A device for removing the strings wrapped around a filled sausage casing to form the filled casing into a length of linked sausages, said device including a frame, a first wheel rotatably mounted on said frame, power means connected to said wheel to rotate said wheel, a second wheel member rotatably mounted on said frame, said wheels being grooved to receive said length of sausages and having means associated therewith to engage said length of sausages with said wheels, said second wheel being spaced from said first wheel whereby each of said wheels will engage a different sausage in said length with a portion of said length extending between said wheels, a fixed member mounted on said frame and associated with said second wheel, and a detent mounted on one of said members and a notch on the other of the members and positioned to be periodically releasably engaged by said detent to briefly restrain the rotation of said second wheel to periodically apply an axial tension to said portion of said length.

6. A device for removing the linking strings from about a length of link sausages, said device comprising a pair of spaced sausage engaging and holding means, and tension and release means operatively associated with said sausage engaging and holding means for applying an axial tension to said length of sausages and releasing said tension at least once.

7. A device for removing the linking strings from about a length of link sausages, said device including a frame, a first sausage engaging means on said frame, a second sausage engaging means mounted on said frame and spaced from said first means whereby each of said means will engage a different sausage in said length with a portion of said length extending between said means, and periodic tension applying means associated with said sausage engaging means for periodically applying an axial tension to said portion of said length between said sausage engaging means.

8. A device for removing the linking strings from about a length of link sausages, said device including a frame, a first sausage engaging means mounted on said frame, a second sausage engaging means mounted on said frame and spaced from said first means whereby each of said means will engage a different sausage in said length with a portion of said length extending between said means, power means connected to one of said engaging means to longitudinally move said length of sausages with respect to said engaging means, and periodic tension applying means associated with said sausage engaging means for periodically applying an axial tension to said portion of said length between said sausage engaging means.

References Cited in the file of this patent
UNITED STATES PATENTS

| | | |
|---|---|---|
| 2,326,082 | Walter | Aug. 3, 1943 |
| 2,644,982 | Schneider | July 14, 1953 |
| 2,686,927 | Grey | Aug. 24, 1954 |
| 2,694,217 | Anderson et al. | Nov. 16, 1954 |
| 2,730,754 | Schneider | Jan. 17, 1956 |